US012710955B2

(12) United States Patent
Singh et al.

(10) Patent No.: US 12,710,955 B2
(45) Date of Patent: Aug. 18, 2026

(54) GRANULAR MANAGEMENT OF DEPLOYMENT UNITS IN A MODULARIZED SOFTWARE PLATFORM

(71) Applicant: FAIR ISAAC CORPORATION, Minneapolis, MN (US)

(72) Inventors: Hemant Singh, Fort Worth, TX (US); Rohini Rangaraj, Canton, MI (US); Venkatesh Rambhau Karadbhajne, Fremont, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 136 days.

(21) Appl. No.: 18/584,858

(22) Filed: Feb. 22, 2024

(65) Prior Publication Data

US 2025/0138806 A1 May 1, 2025

Related U.S. Application Data

(60) Provisional application No. 63/593,887, filed on Oct. 27, 2023.

(51) Int. Cl.
*G06F 9/44* (2018.01)
*G06F 8/65* (2018.01)

(52) U.S. Cl.
CPC .................................... *G06F 8/65* (2013.01)

(58) Field of Classification Search
CPC ........................................................ G06F 8/65
See application file for complete search history.

(56) References Cited

U.S. PATENT DOCUMENTS

| | | | | |
|---|---|---|---|---|
| 10,642,599 | B1 * | 5/2020 | Killmon | G06F 8/65 |
| 2014/0189641 | A1 | 7/2014 | Anderson et al. | |
| 2015/0205602 | A1 | 7/2015 | Prismon et al. | |
| 2015/0347120 | A1 * | 12/2015 | Garg | G06F 8/65 709/223 |
| 2017/0308822 | A1 | 10/2017 | Prismon et al. | |
| 2023/0297403 | A1 * | 9/2023 | Kumar | G06F 9/45558 718/1 |
| 2024/0394149 | A1 * | 11/2024 | Ambaljeri | G06F 16/2358 |

* cited by examiner

*Primary Examiner* — Qamrun Nahar
(74) *Attorney, Agent, or Firm* — Mintz, Levin, Cohn. Ferris, Glovsky and Popeo, P.C.; F. Jason Far-hadian, Esq.

(57) ABSTRACT

A computer-implemented method for managing deployment units in a decision management platform; the method comprises creating a revision of a deployment unit selected from a list of deployment units available for a solution, wherein the solution is an application that results in a change to the decision management platform; receiving a promotion request to promote the revision to a lifecycle environment, wherein the revision comprises a snapshot of the selected deployment unit at a time of the promotion request to promote the revision; and deploying the revision of the deployment unit to the lifecycle environment upon approval of the promotion request, wherein the deployment units are managed independently from one another.

19 Claims, 7 Drawing Sheets

Creating a revision of a deployment unit selected from a list of deployment units available for a solution 502

Receiving a promotion request to promote the revision to a lifecycle environment 504

Deploying the revision of the deployment unit to the lifecycle environment upon approval of the promotion request 506

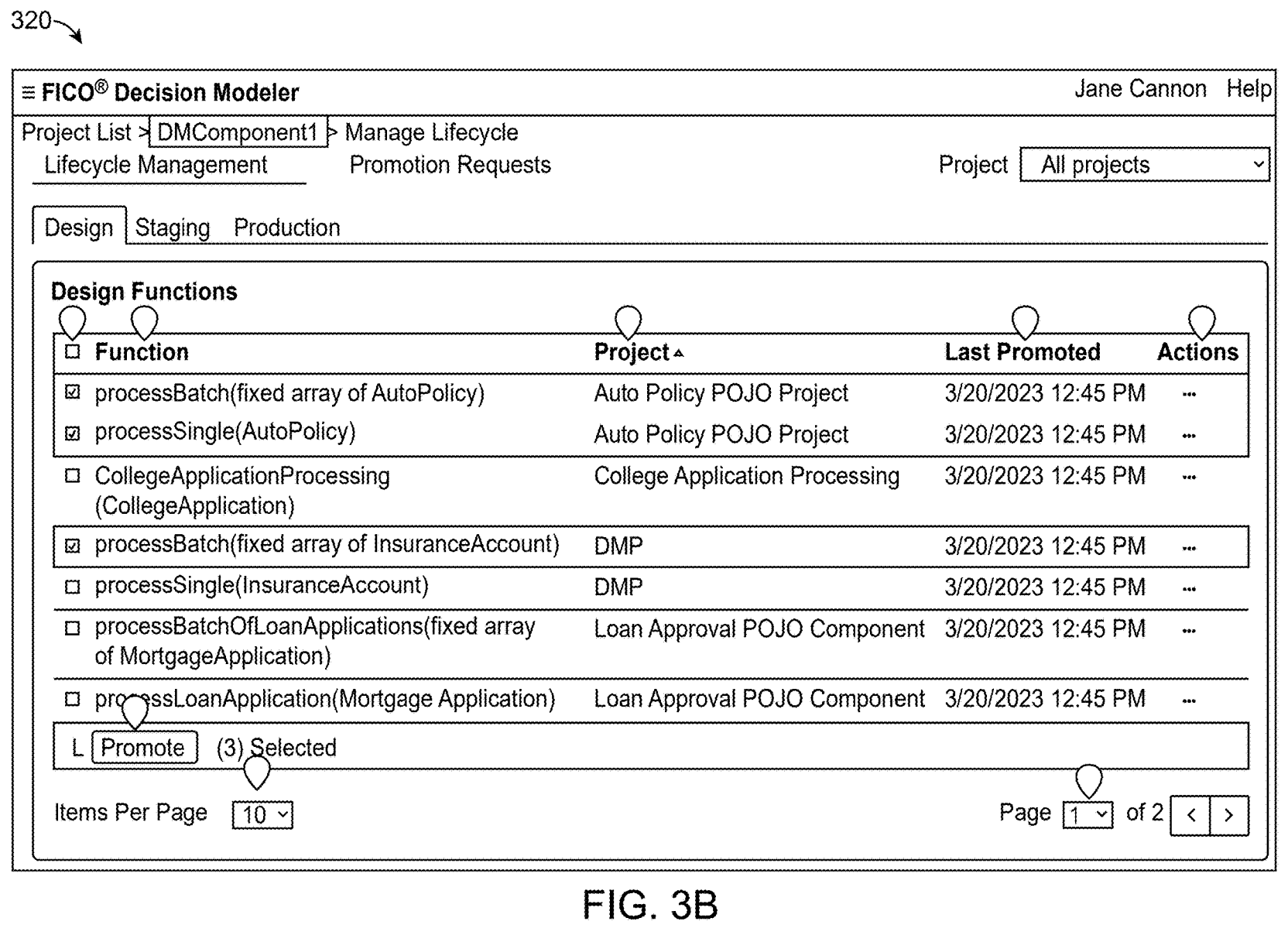

320

≡ FICO® Decision Modeler Jane Cannon Help

Project List > DMComponent1 > Manage Lifecycle

Lifecycle Management Promotion Requests Project All projects

Design Staging Production

Design Functions

| ☐ Function | Project ▲ | Last Promoted | Actions |
|---|---|---|---|
| ☑ processBatch(fixed array of AutoPolicy) | Auto Policy POJO Project | 3/20/2023 12:45 PM | ... |
| ☑ processSingle(AutoPolicy) | Auto Policy POJO Project | 3/20/2023 12:45 PM | ... |
| ☐ CollegeApplicationProcessing (CollegeApplication) | College Application Processing | 3/20/2023 12:45 PM | ... |
| ☑ processBatch(fixed array of InsuranceAccount) | DMP | 3/20/2023 12:45 PM | ... |
| ☐ processSingle(InsuranceAccount) | DMP | 3/20/2023 12:45 PM | ... |
| ☐ processBatchOfLoanApplications(fixed array of MortgageApplication) | Loan Approval POJO Component | 3/20/2023 12:45 PM | ... |
| ☐ processLoanApplication(Mortgage Application) | Loan Approval POJO Component | 3/20/2023 12:45 PM | ... |

L Promote (3) Selected

Items Per Page 10 Page 1 of 2 < >

FIG. 3B

GRANULAR MANAGEMENT OF DEPLOYMENT UNITS IN A MODULARIZED SOFTWARE PLATFORM

TECHNICAL FIELD

The subject matter described herein relates to systems and methods for function management in a modularized software platform, for example, a decision management platform. The subject matter described herein further relates to granular management of functions and/or deployment units in a modularized software platform and/or a decision management platform.

BACKGROUND

Modularized software platforms are digital frameworks designed to support the development, deployment, and integration of separate, interchangeable modules, each of which may serve a distinct functionality within the larger system. These platforms enable addition, updating, or removal of modules with minimal impact on the rest of the system, thereby facilitating scalability, flexibility, and maintainability. Decision Management Platforms (DMPs) represent a type of modularized software platforms, which are software systems that allow organizations to automate and optimize decision-making processes. These platforms typically provide a suite of tools and features that enable users to model, simulate, test, and deploy decision-making algorithms and rules, for example, to build solutions consisting of a number of functions. One of the core features of DMPs is the ability to manage the lifecycle of these functions, which can range from simple rules to complex machine learning models.

In a typical DMP, a function, also known as a deployment unit and/or a decision-making component, is created in a design or development environment. It may then be promoted to a staging environment where it undergoes testing and validation in a setting that closely mirrors the production environment. Finally, the function is promoted to a production environment where it is used to make real-world decisions. In other words, the lifecycle of the functions in a DMP comprises design and development, testing in staging, deployment to production phases.

The process of promoting a function from one environment to another is known as lifecycle management. Lifecycle management is a complex process that involves not just the movement of the function, but also the management of associated metadata, configurations, and dependencies. It sometime also involves ensuring that the function operates correctly and efficiently in each environment, and that any changes to the function do not adversely affect other functions or components in the system.

In currently utilized platform setups, lifecycle management functionality is primarily structured around specific solutions consisting of multiple functions, creating a challenge for users who cannot transition functions (i.e., also referred to as deployment units or decision services) between environments without affecting others. This challenge may be exacerbated by the close integration of lifecycle processes and deployments, preventing a user from exclusively advancing their adjustments to an individual function across environments without simultaneously pushing associated services within the same solution. Furthermore, if a platform's lifecycle framework lacks granularity at the function service level, even minor changes may result in significant computational power and storage resource demands, leading to inefficiencies that decelerate user operations. As organizations delve deeper into building intricate solutions encompassing numerous functions, and as collaboration among multiple users intensifies, there exists a need for streamlined management throughout the solution development process for the DMP.

SUMMARY

Methods, systems, and articles of manufacture, including computer program products, are provided for granular deployment units management. In another aspect, there is provided a method. The method includes: creating a revision of a deployment unit selected from a list of deployment units available for a solution, wherein the solution is an application that results in a change to the decision management platform; receiving a promotion request to promote the revision to a lifecycle environment, wherein the revision comprises a snapshot of the selected deployment unit at a time of the promotion request to promote the revision; and deploying the revision of the deployment unit to the lifecycle environment upon approval of the promotion request, wherein the deployment units are managed independently from one another.

In some variations, the change to the decision management platform relates to one or more of addressing a particular set of requirements or to solving a specific problem.

In some variations, the revision further comprises a solution ID corresponding to the solution.

In some variations, the deployment unit is a function of the decision management platform.

In some variations, the lifecycle environment is one of a design environment, a staging environment, and a production environment.

In some variations, the method further comprises storing information about the revision and the promotion in an operational data storage.

In some variations, the method further comprises storing assets of the revision in a storage bucket.

In some variations, the approval of the promotion request is automatic for promotion to a staging environment.

In some variations, the approval of the promotion request requires user approval for promotion to a production environment.

In some variations, the method further comprises providing a set of REST APIs for triggering the promotion request and/or for retrieving information about the promotion.

In some variations, the method further comprises deleting the revision upon receiving a deletion request, wherein the deletion is prevented if the revision is in use in any of the lifecycle environments.

In one aspect, there is provided a system. The system may include at least one processor and at least one memory. The at least one memory may store instructions that result in operations when executed by the at least one processor. The operations may include: creating a revision of a deployment unit selected from a list of deployment units available for a solution, wherein the solution is an application that results in a change to the decision management platform; receiving a promotion request to promote the revision to a lifecycle environment, wherein the revision comprises a snapshot of the selected deployment unit at a time of the promotion request to promote the revision; and deploying the revision of the deployment unit to the lifecycle environment upon approval of the promotion request, wherein the deployment units are managed independently from one another.

In another aspect, there is provided a computer program product including a non-transitory computer readable medium storing instructions. The operations include creating a revision of a deployment unit selected from a list of deployment units available for a solution, wherein the solution is an application that results in a change to the decision management platform; receiving a promotion request to promote the revision to a lifecycle environment, wherein the revision comprises a snapshot of the selected deployment unit at a time of the promotion request to promote the revision; and deploying the revision of the deployment unit to the lifecycle environment upon approval of the promotion request, wherein the deployment units are managed independently from one another.

Implementations of the current subject matter can include, but are not limited to, methods consistent with the descriptions provided herein as well as articles that include a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 3B is a diagram illustrating an example user interface for managing deployment units in the DMP, according to one or more embodiments consistent with the current subject matter;

Figure 1:
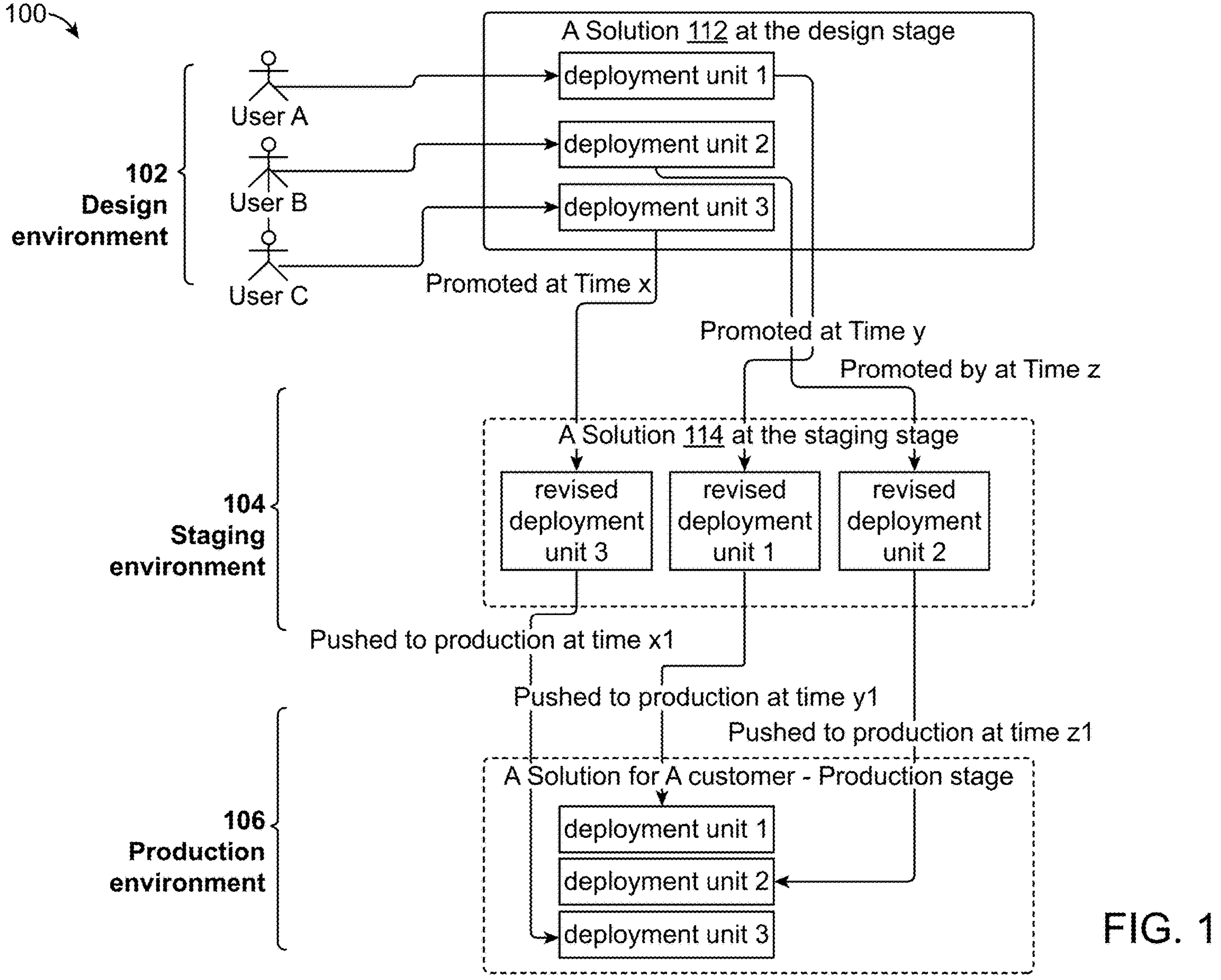
FIG. 1 is a diagram illustrating an architecture for function lifecycle management, according to one or more embodiments consistent with the current subject matter.

When practical, like labels are used to refer to same or similar items in the drawings.

DETAILED DESCRIPTION

The details of one or more variations of the subject matter described herein are set forth in the accompanying drawings.

As discussed herein elsewhere, there exists a need for improved lifecycle management granularity throughout the solution development process for a modularized software platform, such as a DMP. Approaches discussed herein may be achieved by managing deployment units, or functions, individually and separately rather than pushing the entire solution to a lifecycle environment, which may provide a more granular and nimble lifecycle management to customers, allowing for more flexibility and efficiency in managing revisions in the solution creation process within a DMP. Modern software development and deployment practices make it possible not to push the entire solution anymore. In some embodiments, a solution may refer to a specific application or system that is designed to address a particular set of requirements or to solve a specific problem within the Decision Management Platform (DMP). A solution can be composed of multiple functions (i.e., deployment units) that work together to provide the desired functionality. As noted herein elsewhere, these functions may include various decision services, machine learning models, or other decision-making components that are managed and deployed through the platform. The solution may represent a cohesive set of these components that, when combined, fulfill a particular business or operational goal. In many cases, a solution may consist of multiple independent functions that can be updated, tested, and deployed separately. This is particularly true in a microservices architecture, where each service (or function, in this case) is independent and loosely coupled with others, thereby improving maintainability and testability for solution users. To achieve this, the method may include creating a revision of the selected deployment unit and promoting this revision to a lifecycle environment upon approval. This allows for individual functions to be updated and promoted without affecting the rest of the solution. For example, if there is a dependency between functions, the method may bundle the required dependencies in an immutable package during the revision creation. This may ensure that any further changes in those dependencies will not impact or alter the immutable package, thereby ensuring that the revision remains consistent and stable over time. The function lifecycle management may handle lifecycle stages and management of deployment units (functions) and may not be responsible for deployment activities. Instead, it may use the Function Web Service Deployer (FWSD) service to perform deployments upon approval of a promotion. The function lifecycle management may store information about the revision and the promotion in an operational data storage, and the assets of the revision in a storage bucket. This ensures that all relevant information and assets related to the revision are stored and can be accessed when the revision is deployed to the lifecycle environment. Operational data storage may often be used to store structured data related to the operations of the system. Storing information about the revision and the promotion, which may include details such as when the revision was created, who approved the promotion, when the promotion occurred, and so on, in an operational database may facilitate tracking and auditing purpose for the function lifecycle management, and to effectively manage the state of the system. A storage bucket may be utilized to store the assets of the revision. These assets could include the actual code of the function, configuration files, dependencies, and other related files. These are the actual materials that may be deployed to the lifecycle environment when the promotion is approved. Furthermore, the function lifecycle management may provide a set of REST APIs for triggering the promotion request and for retrieving information about the promotion. This allows for easy integration with other systems and services. Finally, the function lifecycle management may delete the revision upon receiving a deletion request, unless the revision is in use in any of the lifecycle environments. This ensures that revisions that are still in use are not accidentally deleted.

FIG. 1 is a diagram illustrating an architecture 100 for function lifecycle management, according to one or more embodiments consistent with the current subject matter. As shown in FIG. 1, the function lifecycle management architecture 100 may include capacities to enable a number of lifecycle environments, which may include a design environment 102, a staging environment 104, and/or a production environment 106. As discussed herein elsewhere, the design environment 102 is the initial stage where the solution is created and developed. This environment 102 is primarily used for authoring the solutions and functions within the solutions before they are moved to the next stage. As shown in FIG. 1, a set of users (e.g., User A, User B, and User C) may collaborate in creating a solution, for example, a solution 112 at the design stage. As discussed herein elsewhere, a solution may refer to a specific software application or system that is designed to address a particular set of requirements or to solve a specific problem within the Decision Management Platform (DMP). A solution can be composed of multiple functions (i.e., deployment units) that work together to provide the desired functionality. As shown in FIG. 1, each user of the set of users may author one or more deployment unit, and those deployment units 1, 2, and 3 are independent from one another. As shown in FIG. 1, each user of the set of users, i.e., User A, User B, and User C may collaborate on one project, for example, constructing a solution (e.g., solution 112 in FIG. 1). This may facilitate collaboration by enabling users to promote or push functions to subsequent environments. This collaborative feature is particularly beneficial when transitioning functions through various stages of the lifecycle, ensuring that team members can effectively work together and manage the deployment units within the decision management platform.

The staging environment 104 is the intermediate stage where the selected function (i.e., a revised deployment unit) is further tested in a setting that closely mirrors the production environment. This environment 104 is used to identify and fix any issues that might not have been caught in the design environment. Finally, the production environment 106 is the final stage where the function is deployed for actual use. This environment is where the function performs its intended tasks in real-world scenarios. The architecture 100 facilitates the transition of a function through these environments, while allowing the individual migration of the functions across these environments. As shown in FIG. 1, when a deployment unit is promoted from design environment 102 to a staging environment 104, the platform may create a revision of the promoted deployment unit, and send a request to promote the newly created revision. The revision of the promoted deployment unit may include a snapshot of the deployment unit at the time of promotion. In some embodiments, the term snapshot may refer to a specific instance or version of a deployment unit (function) within the decision management platform at the time of the promotion request. This snapshot captures the state of the deployment unit, including its code, configuration, and any associated metadata, effectively creating an immutable package. This means that the snapshot, once taken, cannot be altered or changed; it is fixed and serves as a historical record of the deployment unit at that specific point in time. This immutability may facilitate version control and deployment processes, ensuring that the exact version of the deployment unit can be promoted, rolled back, or redeployed consistently across different lifecycle environments without unintended changes. Additionally or alternatively, the revision may include information indicating solution ID of the solution to which the revision belongs to. The solution ID may facilitate a number of functions, such as linking function revisions to their respective parent solutions, enabling efficient tracking and management of those function revisions, guiding the deployment process to ensure that the correct assets are deployed within the appropriate solution context, aiding in auditing and reporting by providing a means to filter and report on solution-specific activities, enforcing access control policies, and supporting integrations with other systems or services for synchronized management of related entities. In some embodiments, the revision may also include information regarding other functions (i.e., deployment units) within the solution, and/or the dependency and function calling information among the functions. In some embodiments, the information regarding other functions may facilitate version compatibility, for example, it may ensure that the revision of the deployment unit is compatible with other functions within the same solution. By tracking which versions of other functions this revision is designed to work with, the system can prevent conflicts that might arise from incompatible changes. In some embodiments, the information regarding other functions may provide coordinated updates. For example, in complex solutions where functions may interact or rely on each other, it is often desirable to update related functions in a coordinated manner. Including information about other functions may allow for better planning and execution of such coordinated updates. Additionally or alternatively, the revision may include information about the promotion request itself, such as the time of the request and the user who initiated it.

In some embodiments, the function lifecycle management architecture 100 may include capacities to enable additional lifecycle environments beyond the design environment 102, the staging environment 104, and/or the production environment 106. For example, the function lifecycle management architecture 100 may include capacities to enable an additional User-Acceptance Testing (UAT) environment. In some embodiments, the function lifecycle management architecture 100 may support fewer lifecycle environments;

for instance, the lifecycle environments 100 may include only a development environment and a production environment.

In some embodiments, a revision may refer to a specific instance or version of a function within the decision management platform. When a function is selected to be part of a solution, a revision of that function is created. This revision may be a pseudo duplicate of the original function, capturing its state at the time of creation. The revision may include the solution ID and records the function's relationships or dependencies with other functions within the solution. This process may allow for precise tracking and management of individual function versions, facilitating more efficient updates, testing, and deployment within the platform. For example, consider a function named "CreditScoreCalculation" that is part of a financial decision-making solution. When a developer makes changes to this function to improve its accuracy or to apply particular configurations that suit specific needs, they may create a new revision of "CreditScoreCalculation". This revision, namely "CreditScoreCalculation_Rev2", is a snapshot of the function at the time the changes were finalized. The revision "CreditScoreCalculation_Rev2" will include a specific solution ID, say "FinancialSolution_001", indicating that it is part of the "FinancialSolution" application. It may also document the relationships or dependencies that "CreditScoreCalculation" has with other functions within "FinancialSolution_001", such as "LoanApprovalProcess" or "RiskAssessmentModule". By creating this revision, the platform can track that "CreditScoreCalculation_Rev2" was updated to include a new algorithm for assessing credit risk, while still maintaining the original version, "CreditScoreCalculation_Rev1", for comparison or rollback purposes. This allows for testing the new revision in isolation or in conjunction with other related functions without disrupting the existing production environment. Furthermore, if "CreditScoreCalculation_Rev2" is found to be more effective during testing in the staging environment, it can be promoted to production independently of other functions. This granular approach to version management ensures that updates are delivered efficiently and with reduced risk, as each function's lifecycle can be managed individually and independently.

Figure 2:
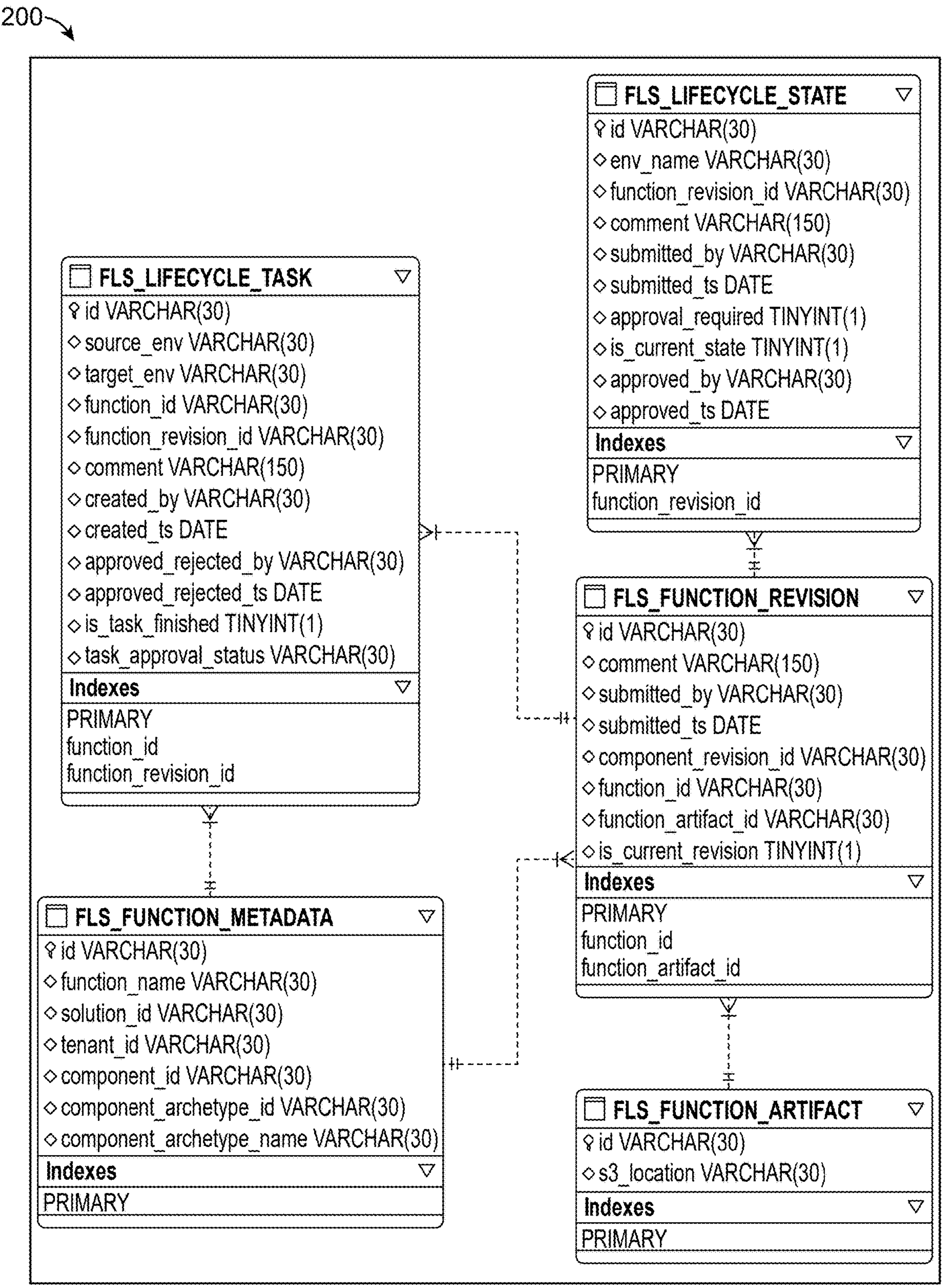
FIG. 2 is a diagram illustrating operational data storage 200 for storing information about the deployment units and/or revised deployment units, according to one or more embodiments consistent with the current subject matter.

Additionally, any assets related to the revision may be stored in a storage bucket, which is a cloud-based storage container. The term "asset" may refer to any file or piece of data that is part of or associated with a revision (i.e., a revised deployment unit/a revised function). Assets may include the source code, configuration files, scripts, documentation, libraries, and any other files that are used to build, deploy, or run the function. Storing the assets in a storage bucket may ensure that all relevant information and assets related to the revision are preserved and can be accessed when the revision is deployed to the lifecycle environment. As shown in FIG. 2, the revisions (i.e., revised deployment units 1, 2, and 3) in the staging environment 104 may be managed individually and separately, this may allow for more granular control and flexibility in the deployment process. Each revised deployment unit (i.e., revision) can be tested, reviewed, and promoted to the production environment 106 independently of the others. This means that changes to one deployment unit do not necessarily impact or delay the progress of others. This individual management of revisions of functions can lead to more efficient troubleshooting, as issues can be isolated to specific deployment units/functions. Furthermore, it can also enable faster and more frequent updates, as each revision can be moved to production as soon as it is ready, without having to wait for revisions to other deployment units that are contained in the solution (i.e., a data packet consisting of multiple deployment units). The purpose of storing these assets in a bucket is to ensure that they are preserved and readily available for deployment. When a revision is ready to be moved to a different lifecycle environment (such as from staging to production), all the associated assets can be easily accessed and deployed. The ability to manage revisions (revised deployment units) individually and separately in the staging environment provides a more granular level of control over the deployment process. This means that each revision can be independently tested, reviewed, and, if approved, promoted to the production environment without affecting other deployment units. This approach allows for more precise and efficient management of software updates and deployments, as changes to one function do not necessitate changes to all functions within the solution.

FIG. 2 is a diagram illustrating operational data storage 200 for storing information about the deployment units and/or revised deployment units. As shown in FIG. 2, in some implementations, the function lifecycle management may operate as a service provider within the DMP. Alternatively or additionally, the function lifecycle management could be integrated directly into the core services of the DMP, without being a separate service provider. For example, the DMP's main application logic could include built-in functionality for managing the lifecycle of functions, thereby eliminating the need for a separate service provider. This approach might be utilized in systems where tight integration is more beneficial. Furthermore, the function lifecycle management could be implemented using a microservices architecture, where each microservice is responsible for a specific aspect of the lifecycle, such as version control, deployment, or monitoring. For example, one microservice could handle the creation and management of function revisions, while another could be responsible for orchestrating the promotion of these revisions through various lifecycle environments. This would allow for greater scalability and flexibility, as each microservice could be developed, deployed, and scaled independently. Similar to other service providers within the DMP, the function lifecycle may utilize a shared relational database management system (RDBMS) instance, referred to as "servicedb". In an implementation where the DMP is deployed on the Amazon Web Services (AWS) platform, the Aurora RDBMS managed service may be employed. The function lifecycle may be configured to store information pertaining to the revisions of functions and the promotions of functions within a specific solution. As shown in FIG. 2, this information may be stored in a structured manner, as depicted in the entity relationship diagram of the function lifecycle service. This structured storage of information facilitates efficient retrieval and management of data related to the lifecycle of functions within the DMP. The function lifecycle may also store information about the revision and the promotion in an operational data storage. This includes data such as the revision identifier, the function identifier associated with the revision, the user who created the revision, the timestamp of the revision creation, and the promotion status of the revision. This operational data storage enables tracking of the lifecycle of each function revision and provides a historical record of the promotions, thereby supporting auditability and traceability of the function lifecycle management process.

In some embodiments, the function lifecycle service is responsible for versioning the function assets. The versioning and metadata information of the function is stored within the operational data storage (ODS), while the contents of the function assets are saved in storage buckets (e.g., AWS S3 buckets) associated with the corresponding solution. For example, the function assets may be tracked in an S3 bucket named 'fic-packages' under the tenant bucket. Within the tenant bucket, a specific folder structure is maintained for storing function revisions. Naturally, as the bucket is created by the S3 provider, it is also responsible for removing the bucket and all of its contents once a solution is deleted within the platform. This ensures efficient management and cleanup of function assets associated with each solution.

Figure 3A:
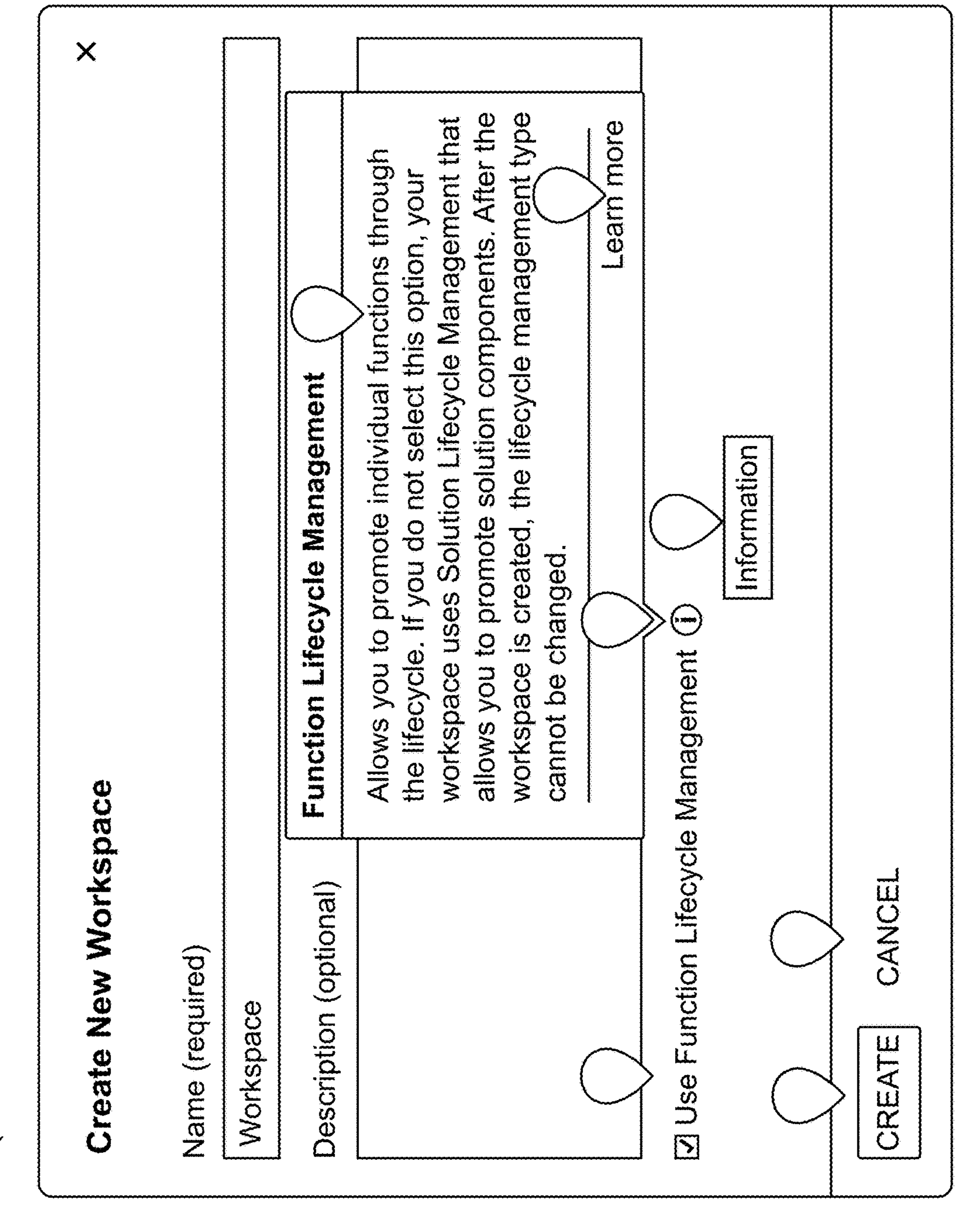
FIG. 3A is a diagram illustrating an example user interface for managing deployment units in the decision management platform (DMP), according to one or more embodiments consistent with the current subject matter.

FIG. 3A is a diagram illustrating an example user interface 300 for managing deployment units in the DMP, according to one or more embodiments consistent with the current subject matter. As shown in FIG. 3A, the user interface (UI) 300 may demonstrates how the function lifecycle service be integrated into the Decision Modeler landing page. As shown in FIG. 3A, a user has the option to opt-in for a newly created workspace (a DMP solution) in the Decision Modeler landing page to support the function lifecycle feature. This opt-in model helps to prevent backward compatibility challenges and ensures that this solution supports the function lifecycle, and not the solution or component lifecycle. This opt-in option may be available at the time of solution creation. In some embodiments, once the user opts in for the "Function Lifecycle" during the solution creation, the user may be forbidden from opting out of it. This design decision ensures consistency and integrity in the management of the function lifecycle within the solution.

FIG. 3B is a diagram illustrating an example user interface 320 for managing deployment units in the DMP, according to one or more embodiments consistent with the current subject matter. For solution workspaces (i.e., the workspaces facilitating construction of the solutions) that have the function lifecycle feature enabled, a Manage Lifecycle 320 view may be displayed. This view may provide the user with a list of all or a portion of the available functions in the design stage that can be promoted for constructing this solution. At the time when the user decides to promote a function from the 'design' to the 'staging' environment, a function revision is created and a request to promote this newly created revision is sent. In some embodiments, by default, promotion from the design to the staging environment does not require any approval, and the function is directly promoted to 'staging'. However, organizations may choose to implement additional governance controls based on their specific operational requirements or regulatory compliance obligations. For instance, they might introduce a mandatory review process for all promotions, even from design to staging, to ensure that every change is scrutinized and validated by a qualified individual or team before it moves forward in the lifecycle. Additionally, the promotion process may be configured to include automated testing or quality checks that a function revision has to pass before it can be promoted to the staging environment. This process streamlines the promotion of individual functions, enhancing the efficiency of managing changes in the solution.

Figure 3C:
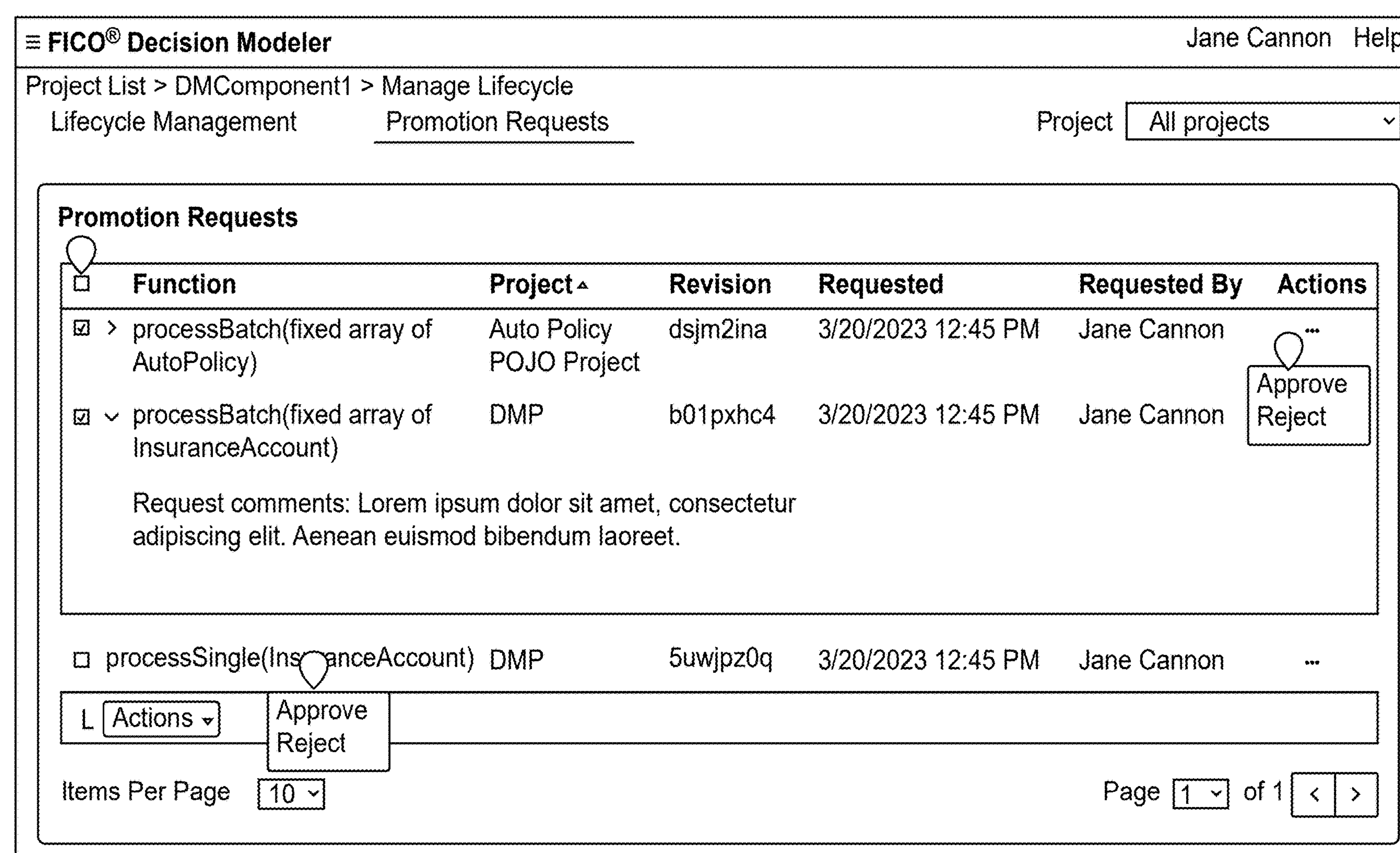
FIG. 3C is a diagram illustrating an example user interface for managing deployment units in the DMP, according to one or more embodiments consistent with the current subject matter.

FIG. 3C is a diagram illustrating an example user interface 350 for managing deployment units in the DMP, according to one or more embodiments consistent with the current subject matter. As shown in FIG. 3C, when a user initiates a promotion from the 'staging' to the 'production' environment, approval may be mandatory. In some implementations of the function lifecycle service within the DMP, various user roles may be defined, each with specific responsibilities and authorities. An Admin, for instance, may be responsible for managing the overall system, including setting up and configuring the environment, managing users and their roles, and overseeing the overall operation of the system. A configurer, in some cases, may be tasked with setting up and configuring the deployment units or functions within the DMP, creating and managing the revisions of the deployment units, and preparing them for promotion to different lifecycle environments. In some scenarios, an Approver's main responsibility may be to review and approve promotion requests, ensuring that changes are reviewed before being promoted to the production environment. A Deployer, in some instances, may be responsible for deploying the approved revisions to the respective lifecycle environments, executing the deployment process once a promotion request is approved. Lastly, an App_Developer may be tasked with creating and updating the deployment units or functions, working in the design environment to build and test the functions before they are ready for promotion to the staging environment. These roles, in various combinations, can contribute to managing the deployment units in the DMP, ensuring a smooth and efficient process from design to production. As shown in FIG. 3C, the approvers may have visibility of a list of all requests which are pending approval in the "Promotion Requests" tab.

In the method of managing deployment units in a decision management platform, a set of REST (Representational State Transfer) APIs (Application Programming Interfaces) may be provided for triggering the promotion request and for retrieving information about the promotion. REST APIs are a set of rules and conventions for building and interacting with web services. They provide a way for systems to communicate with each other in a stateless manner, making them ideal for use in distributed systems like the decision management platform. The REST APIs provided in this method may be designed to facilitate the management of deployment units in the decision management platform. For example, they may provide a programmatic interface for interacting with the platform, allowing users to automate and streamline the management of deployment units. The REST APIs may be designed to be simple and intuitive to use, with clear and consistent naming conventions and data structures.

One of the REST APIs provided in this method is for triggering the promotion request. This API receives a request to promote a revision of a deployment unit to a lifecycle environment. The request includes the identity of the revision and the target lifecycle environment. Upon receiving the request, the API triggers the promotion process, which involves creating a promotion request, reviewing the revision, and if approved, deploying the revision to the target lifecycle environment. Another REST API provided in this method is for retrieving information about the promotion. This API receives a request to retrieve information about a promotion request. The request includes the identity of the promotion request. Upon receiving the request, the API retrieves the requested information from the operational data storage and returns it to the requester. The information returned can include details about the revision, the target lifecycle environment, the status of the promotion request, and any other relevant data. These REST APIs provide a powerful and flexible interface for managing deployment units in the decision management platform. They allow users to automate and streamline the management of deployment units, reducing the complexity and effort involved in managing the lifecycle of deployment units. Furthermore, by providing programmatic access to the platform, these APIs enable the integration of the decision management platform with other systems and services, further enhancing the capabilities and utility of the platform.

In the method of managing deployment units in a decision management platform, there may exist a provision for deleting a revision upon receiving a deletion request. This process may be initiated when a request to delete a specific revision of a deployment unit is received. The request includes the identity of the revision to be deleted. Upon receiving the request, the system initiates the deletion process. In some embodiments, the deletion process may involve a check to determine if the revision is currently in use in any of the lifecycle environments. A revision is considered to be in use if it has been promoted to a lifecycle environment and is currently active in that environment. This could be the case if the revision has been deployed to the environment and is currently executing, or if the revision is part of a promotion request that is pending approval. If the revision is in use in any of the lifecycle environments, the deletion is prevented. This safeguard is in place to ensure that active revisions, which may be executing tasks or awaiting promotion, are not inadvertently deleted. This could potentially disrupt the operation of the application or solution, leading to errors or system instability. Therefore, the system checks the status of the revision in all lifecycle environments before proceeding with the deletion. If the revision is not in use in any of the lifecycle environments, the deletion process proceeds. The revision is removed from the operational data storage, and its associated assets are deleted from the storage bucket. This effectively removes the revision from the decision management platform, freeing up resources and maintaining the integrity of the lifecycle management process. In summary, the process of deleting a revision upon receiving a deletion request is a careful and controlled process. It involves checking the status of the revision in all lifecycle environments, and preventing the deletion if the revision is in use. This ensures that active revisions are protected, and that the integrity and stability of the application or solution are maintained.

Figure 5:
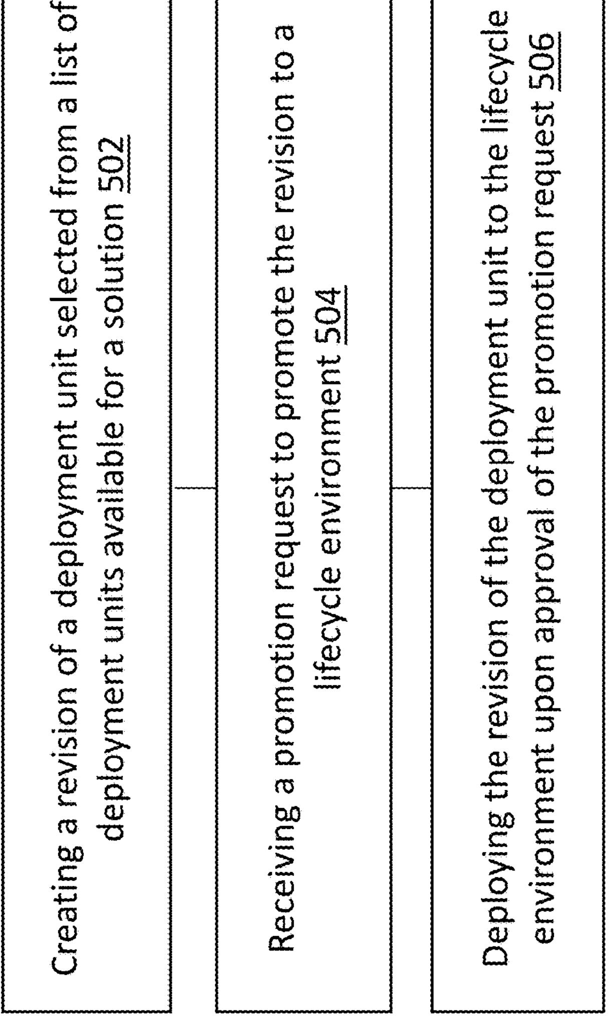
FIG. 5 is a process flow diagram illustrating a process for the platform and systems provided herein to manage deployment units using a function lifecycle service, according to one or more implementations of the current subject matter.

FIG. 5 is a process flow diagram illustrating a process 500 for the platform and systems provided herein to manage deployment units using a function lifecycle service, according to one or more implementations of the current subject matter. The process 500 may begin with operation 502, wherein the system may create a revision of a deployment unit selected from a list of deployment units available for a solution. In some embodiments, this may involve providing a visualization of a list of deployment units available for a solution to a user. As described herein elsewhere, the solution may be an application that may result in a change to the decision management platform. For example, the changes may address a particular set of requirements or to solve a specific problem within the decision management platform. In some embodiments, the system may generate a graphical depiction of an array of deployment units available for a designated solution, enabling users to have a comprehensive overview of the deployment units at their disposal. In some embodiments, the system may receive a selection of a deployment unit from the list of deployment units to construct the solution. This may include the users select one or more deployment units from the list to formulate the solution, with the selection process being based on a variety of factors, including but not limited to the specific demands of the solution, the inherent capabilities of the deployment units, and the interdependencies existing between different units, etc.

Subsequent to the selection of a deployment unit the system may create a revision of the selected deployment unit. This may involve a revision pertaining to the selected deployment unit being created, wherein the revision may include a snapshot of the selected deployment unit at a particular time point, thereby documenting its state and configuration. The formulation of a revision facilitates the tracking and management of changes over time, thereby providing a historical record of modifications and enabling the reversion to previous versions if necessitated. Additionally or alternatively, the revision may include information indicating solution ID of the solution to which the revision belongs to. In some embodiments, the revision may also include information regarding other functions (i.e., deployment units) within the solution, and/or the dependency and function calling information among the functions. Additionally or alternatively, the revision may include information about the promotion request itself, such as the time of the request and the user who initiated it.

Next, the process 500 may proceed to operation 504, wherein the system may receive a promotion request to promote the revision to a lifecycle environment. In some embodiments, the lifecycle environment may comprise a design environment, a staging environment, and a production environment. The promotion process may include various checks and approvals, thereby ensuring the readiness of the revision for deployment to the target environment. Upon the receipt of approval for the promotion request, in operation 506, the system may deploy the revision of the deployment unit to the lifecycle environment. This may involve integrating the revised deployment unit into the lifecycle environment upon approval of the promotion request, ready for use in the solution. Throughout the duration of this process, the function lifecycle service orchestrates the deployment units independently of each other, thereby allowing for granular control and flexibility in the management of modifications to the solution.

Use Case

In an example, a CRM (Customer Relationship Management) platform is undergoing an upgrade to enhance its capabilities and introduce new features that address the evolving requirements of its users. The platform consists of various solutions, each containing multiple functions that serve different aspects of customer relationship management, such as sales tracking, customer support, marketing automation, and analytics. The CRM platform development team is tasked with adding a new analytics dashboard feature that provides advanced reporting capabilities to marketing managers. This new feature is a complex solution that involves several deployment units, including data aggregation services, visualization components, and user interface elements. The process may begin with the development team accessing the function lifecycle service to view a list of all available deployment units that can be included in the new analytics dashboard solution. The system may provide a graphical interface that displays the deployment units along with their descriptions, capabilities, and dependencies. The development team may select a data aggregation service that is capable of processing large volumes of customer interaction data to generate insights. A revision of this deployment unit is thereby created by the lifecycle management service, which captures the deployment unit's current state and configuration. This revision includes a snapshot of the service's code, its dependencies on other services, and any configuration parameters that are specific to the analytics dashboard solution. Once the revision is created, the team may submit a promotion request to move the revised data aggregation service from the design environment, where it was developed and tested, to the staging environment. This environment may mirror the production environment and will allow for further integration and user acceptance testing. The promotion request may be automatically approved for the staging environment, as per the organization's policy for non-production environments. The revised data aggregation service is then deployed to the staging environment without affecting other deployment units within the solution. This may allow the team to test the new feature in isolation and ensure its functionality before it impacts the production environment. The analytics dashboard feature is then successfully integrated into the CRM platform's staging environment. Marketing managers may test the new dashboard and provide feedback. The development team monitors the performance and stability of the new feature, making adjustments as reported by the users. Once the feature is validated and approved by all stakeholders, a final promotion request will be submitted to move the analytics dashboard to the production environment, making it available to users of the CRM platform. The granular control and flexibility provided by the function lifecycle service contributes in managing complex solutions within a CRM platform. By allowing individual deployment units to be revised, promoted, and deployed independently, the platform ensures that new features can be developed, tested, and released with minimum disruption to existing services and maximum efficiency in resource utilization.

Figure 4:
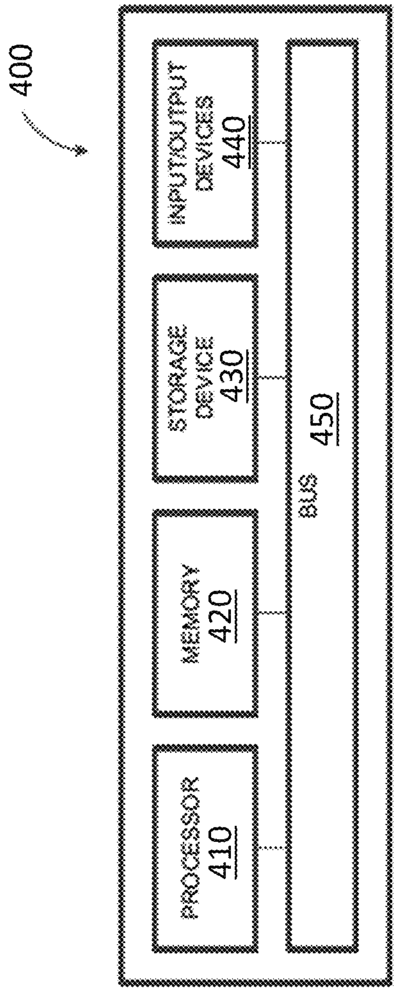
FIG. 4 depicts a block diagram illustrating an example of a computing system, consistent with implementations of the current subject matter.

FIG. 4 depicts a block diagram illustrating a computing system 400 consistent with implementations of the current subject matter. As shown in FIG. 4, the computing system 400 can include a processor 410, a memory 420, a storage device 430, and input/output devices 440. The processor 410, the memory 420, the storage device 430, and the input/output devices 440 can be interconnected via a system bus 450. The computing system 400 may additionally or alternatively include a graphic processing unit (GPU), such as for image processing, and/or an associated memory for the GPU. The GPU and/or the associated memory for the GPU may be interconnected via the system bus 450 with the processor 410, the memory 420, the storage device 430, and the input/output devices 440. The memory associated with the GPU may store one or more images described herein, and the GPU may process one or more of the images described herein. The GPU may be coupled to and/or form a part of the processor 410. The processor 410 is capable of processing instructions for execution within the computing system 400. Such executed instructions can implement one or more components of, for example, the diffusion system 100, the machine learning engine 110, the first machine learning model 120, the second machine learning model 125, and/or the like. In some implementations of the current subject matter, the processor 410 can be a single-threaded processor. Alternately, the processor 410 can be a multi-threaded processor. The processor 410 is capable of processing instructions stored in the memory 420 and/or on the storage device 430 to display graphical information for a user interface provided via the input/output device 440.

The memory 420 is a computer readable medium such as volatile or non-volatile that stores information within the computing system 400. The memory 420 can store data structures representing configuration object databases, for example. The storage device 430 is capable of providing persistent storage for the computing system 400. The storage device 430 can be a floppy disk device, a hard disk device, an optical disk device, or a tape device, or other suitable persistent storage means. The input/output device 440 provides input/output operations for the computing system 400. In some implementations of the current subject matter, the input/output device 440 includes a keyboard and/or pointing device. In various implementations, the input/output device 440 includes a display unit for displaying graphical user interfaces.

According to some implementations of the current subject matter, the input/output device 440 can provide input/output operations for a network device. For example, the input/output device 440 can include Ethernet ports or other networking ports to communicate with one or more wired and/or wireless networks (e.g., a local area network (LAN), a wide area network (WAN), the Internet).

In some implementations of the current subject matter, the computing system 400 can be used to execute various interactive computer software applications that can be used for organization, analysis and/or storage of data in various (e.g., tabular) format (e.g., Microsoft Excel®, and/or any other type of software). Alternatively, the computing system 400 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 440. The user interface can be generated and presented to a user by the computing system 400 (e.g., on a computer screen monitor, etc.).

One or more aspects or features of the subject matter described herein can be realized in digital electronic circuitry, integrated circuitry, specially designed framework specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software frameworks, frameworks, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as “at least one of” or “one or more of” may occur followed by a conjunctive list of elements or features. The term “and/or” may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases “at least one of A and B;” “one or more of A and B;” and “A and/or B” are each intended to mean “A alone, B alone, or A and B together.” A similar interpretation is also intended for lists including three or more items. For example, the phrases “at least one of A, B, and C;” “one or more of A, B, and C;” and “A, B, and/or C” are each intended to mean “A alone, B alone, C alone, A and B together, A and C together, B and C together, or A and B and C together.” Use of the term “based on,” above and in the claims is intended to mean, “based at least in part on,” such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented deployment unit management method comprising:

creating a revision of a deployment unit selected from a list of deployment units available for a solution, wherein the solution is an application that results in a change to a decision management platform;

receiving a promotion request to promote the revision to a lifecycle environment, wherein the revision comprises a snapshot of the selected deployment unit at a time of the promotion request to promote the revision; and deploying the revision of the deployment unit to the lifecycle environment upon approval of the promotion request, wherein the deployment units are managed independently from one another, and deleting the revision upon receiving a deletion request, wherein the deletion is prevented if the revision is in use in any lifecycle environment.

2. The method of claim 1, wherein the change to the decision management platform relates to one or more of addressing a particular set of requirements or to solving a specific problem.

3. The method of claim 1, wherein the revision further comprises a solution ID corresponding to the solution.

4. The method of claim 1, wherein the deployment unit is a function of the decision management platform.

5. The method of claim 1, wherein the lifecycle environment is one of a design environment, a staging environment, and a production environment.

6. The method of claim 1, further comprising storing information about the revision and the promotion in an operational data storage.

7. The method of claim 1, further comprising storing assets of the revision in a storage bucket.

8. The method of claim 1, wherein the approval of the promotion request is automatic for promotion to a staging environment.

9. The method of claim 1, wherein the approval of the promotion request requires user approval for promotion to a production environment.

10. The method of claim 1, further comprising providing a set of REST APIs for triggering the promotion request and/or for retrieving information about the promotion.

11. A computer program product comprising a non-transient machine-readable medium storing instructions that, when executed by at least one programmable processor, cause the at least one programmable processor to perform operations comprising:

creating a revision of a deployment unit selected from a list of deployment units available for a solution, wherein the solution is an application that results in a change to a decision management platform;

receiving a promotion request to promote the revision to a lifecycle environment from among a plurality of lifecycle environments, wherein the revision comprises a snapshot of the selected deployment unit at a time of the promotion request to promote the revision; and deploying the revision of the deployment unit to the lifecycle environment upon approval of the promotion request, wherein the deployment units are managed independently from one another, and responsive to a deletion request, deleting the revision unless the revision is in use in at least one lifecycle environment from among the plurality of lifecycle environments.

12. The computer program product of claim 11, wherein the change to the decision management platform relates to one or more of addressing a particular set of requirements or to solving a specific problem.

13. The computer program product of claim 11, wherein the approval of the promotion request is automatic for promotion to a staging environment, and wherein the approval of the promotion request requires user approval for promotion to a production environment.

14. A system comprising:

at least one programmable processor; and a non-transient machine-readable medium storing instructions that, when executed by the at least one programmable processor, cause the at least one programmable processor to perform operations comprising:

creating a revision of a deployment unit selected from a list of deployment units available for a solution, wherein the solution is an application that results in a change to a decision management platform;

receiving a promotion request to promote the revision to a lifecycle environment, wherein the revision comprises a snapshot of the selected deployment unit at a time of the promotion request to promote the revision; and deploying the revision of the deployment unit to the lifecycle environment upon approval of the promotion request, wherein the deployment units are managed independently from one another, and deleting the revision upon receiving a deletion request, wherein the deletion is prevented if the revision is in use in the lifecycle environment.

15. The system of claim 14, wherein the change to the decision management platform relates to one or more of addressing a particular set of requirements or to solving a specific problem.

16. The system of claim 14, wherein the revision further comprises a solution ID corresponding to the solution.

17. The system of claim 14, wherein the deployment unit is a function of the decision management platform.

18. The system of claim 14, wherein the lifecycle environment is one of a design environment, a staging environment, and a production environment.

19. The system of claim 14, wherein the approval of the promotion request is automatic for promotion to a staging environment, and wherein the approval of the promotion request requires user approval for promotion to a production environment.

* * * * *